(12) United States Patent
Zhang et al.

(10) Patent No.: US 12,213,144 B2
(45) Date of Patent: Jan. 28, 2025

(54) UPLINK CONTROL INFORMATION TRANSMISSION IN WIRELESS COMMUNICATION

(71) Applicant: Apple Inc., Cupertino, CA (US)

(72) Inventors: Yushu Zhang, Beijing (CN); Hong He, San Jose, CA (US); Chunhai Yao, Beijing (CN); Chunxuan Ye, San Diego, CA (US); Dawei Zhang, Saratoga, CA (US); Haitong Sun, Cupertino, CA (US); Jie Cui, San Jose, CA (US); Wei Zeng, Saratoga, CA (US); Wei Zhang, Santa Clara, CA (US); Weidong Yang, San Diego, CA (US); Yang Tang, San Jose, CA (US); Yuchul Kim, San Jose, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/442,644

(22) PCT Filed: May 14, 2020

(86) PCT No.: PCT/CN2020/090372
§ 371 (c)(1),
(2) Date: Sep. 24, 2021

(87) PCT Pub. No.: WO2021/226968
PCT Pub. Date: Nov. 18, 2021

(65) Prior Publication Data
US 2023/0061565 A1    Mar. 2, 2023

(51) Int. Cl.
*H04W 72/23* (2023.01)
*H04L 1/1829* (2023.01)

(52) U.S. Cl.
CPC .......... *H04W 72/23* (2023.01); *H04L 1/1864* (2013.01)

(58) Field of Classification Search
CPC . H04W 72/23; H04W 74/0808; H04W 72/12; H04W 74/004; H04L 1/1812;
(Continued)

(56) References Cited

U.S. PATENT DOCUMENTS

| 2021/0029731 A1* | 1/2021 | Kundu | ............... H04W 74/004 |
| 2022/0104258 A1* | 3/2022 | Moon | ................... H04L 5/0053 |
| 2022/0190993 A1* | 6/2022 | Shin | ...................... H04W 72/12 |

FOREIGN PATENT DOCUMENTS

| CN | 110535613 A | 12/2019 |
| WO | 2017026979 A1 | 2/2017 |

(Continued)

OTHER PUBLICATIONS

PCT Search Report dated Jan. 28, 2021 in connection with PCT Application No. PCT/CN2020/090372.
(Continued)

*Primary Examiner* — Harun Chowdhury
(74) *Attorney, Agent, or Firm* — Kubota & Basol LLP

(57) ABSTRACT

Techniques discussed herein facilitate generation of uplink control information for Enhanced Physical Uplink Control Channel (PUCCH) Format(s) (EPF(s)). One example embodiment employable in a User Equipment (UE) is configured to: determine Hybrid Automatic Repeat reQuest-Acknowledgment (HARQ-ACK) information; generate a PUCCH for a BandWidth Part (BWP) based at least in part on the HARQ-ACK information, wherein the PUCCH has an EPF; determine a PUCCH resource for the PUCCH and a first PRB index for the PUCCH, wherein the PUCCH resource is determined based at least in part on an index of a first Control Channel Element (CCE) of an associated (Continued)

Physical Downlink Control Channel (PDCCH) and a number of CCEs in a Control Resource Set (CORESET) of the associated PDCCH; and map the PUCCH to at least one PUCCH interlace based on the PUCCH resource and the first PRB index for the PUCCH.

18 Claims, 11 Drawing Sheets

(58) Field of Classification Search
CPC ... H04L 1/1864; H04L 1/1854; H04L 1/1861; H04L 27/0006; H04L 5/0007; H04L 5/0055; H04L 5/001; H04L 5/0094; H04L 5/0053
USPC ........................................ 370/252, 329, 330

See application file for complete search history.

(56) References Cited

FOREIGN PATENT DOCUMENTS

| WO | 2017044066 A1 | 3/2017 | |
|---|---|---|---|
| WO | WO-2021029442 A1 * | 2/2021 | |
| WO | WO-2021037245 A1 * | 3/2021 | ........... H04L 1/0003 |

OTHER PUBLICATIONS

PCT Written Opinion dated Jan. 28, 2021 in connection with PCT Application No. PCT/CN2020/090372.
Intel Corporation UL; "Signals and channels for NR-unlicensed"; 3GPP TSG RAN WG1; Meeting #99; R1-1913296; Nov. 22, 20109.
Ericsson; UL Signals and channels for NR-U; 3GPP TSG-RAN WG1; Meeting #99; R1-1912708; Nov. 11, 2019.
LG Electronics; Physical layer design of UL signals and channels for NR-U; 3GPP TSG RAN WG1 #99; R1-1912388; Nov. 22, 2019.
5G; NR; "Physical channels and modulation"; (3GPP TS 38.211 version 15.8.0 Release 15); ETSI TS 138 211 V15.8.0; Jan. 2020.

* cited by examiner

FIG. 7

| | 0 | 1 | 2 | 3 | 4 | 5 | 6 | 7 | 8 | 9 |
|---|---|---|---|---|---|---|---|---|---|---|
| ACK, ACK, N-SR | 6 | 7 | 8 | 9 | 10 | 11 | 0 | 1 | 2 | 3 |
| NACK, NACK, N-SR | 6 | 1 | 8 | 3 | 10 | 5 | 0 | 7 | 2 | 9 |
| ACK, NACK, N-SR | 0 | 7 | 2 | 9 | 4 | 11 | 6 | 1 | 8 | 3 |
| NACK, ACK, N-SR | 6 | 1 | 8 | 3 | 10 | 5 | 0 | 7 | 2 | 9 |
| ACK, ACK, P-SR | 0 | 1 | 8 | 3 | 4 | 11 | 6 | 7 | 2 | 9 |
| NACK, NACK, P-SR | 6 | 7 | 2 | 9 | 10 | 5 | 0 | 1 | 8 | 3 |
| ACK, NACK, P-SR | 0 | 1 | 8 | 3 | 4 | 11 | 6 | 7 | 2 | 9 |
| NACK, ACK, P-SR | 6 | 7 | 2 | 9 | 10 | 5 | 0 | 1 | 8 | 3 |

Cyclic Shift value for different PRBs

700

UPLINK CONTROL INFORMATION TRANSMISSION IN WIRELESS COMMUNICATION

REFERENCE TO RELATED APPLICATIONS

This application is a National Phase entry application of International Patent Application No. PCT/CN2020/090372 filed May 14, 2020, entitled "UPLINK CONTROL INFORMATION TRANSMISSION IN WIRELESS COMMUNICATION", the contents of which are herein incorporated by reference in their entirety.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

BRIEF DESCRIPTION OF THE DRAWINGS

FIG. 7 is a diagram illustrating example Cyclic Shift (CS) mappings for different combinations of values for 2-bit HARQ-ACK and 1-bit SR, according to various aspects discussed herein.

DETAILED DESCRIPTION

Figure 1:
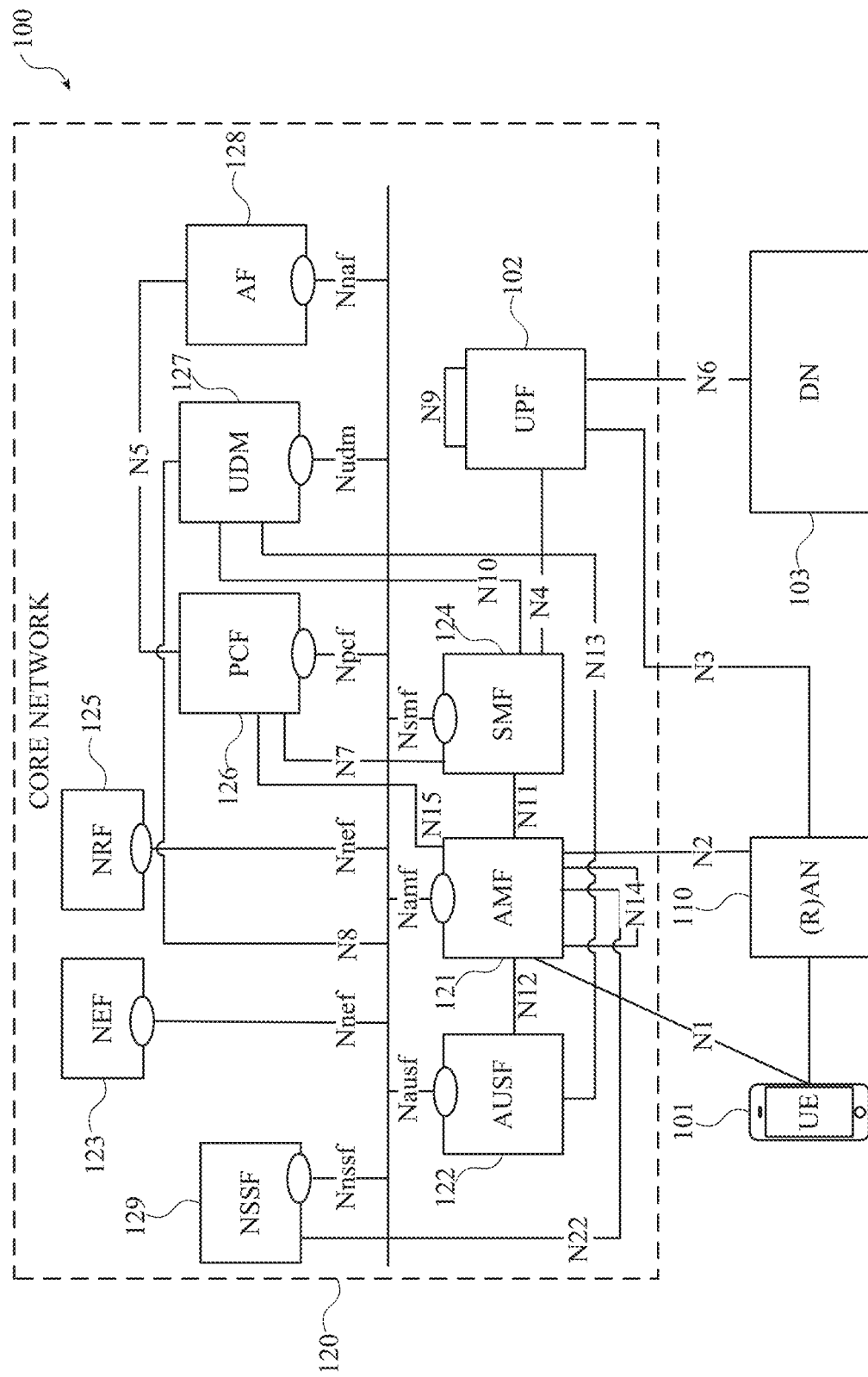
FIG. 1 is a block diagram illustrating an architecture of a system including a Core Network (CN), for example a Fifth Generation (5G) CN (5GC), in accordance with various embodiments.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone or other device configured to communicate via a 3GPP RAN, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more," unless the context indicates otherwise (e.g., "the empty set," "a set of two or more Xs," etc.).

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

Various aspects discussed herein can relate to facilitating wireless communication, and the nature of these communications can vary.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments described herein can be implemented into a system using any suitably configured hardware and/or software. FIG. 1 illustrates an architecture of a system 100 including a Core Network (CN) 120, for example a Fifth Generation (5G) CN (5GC), in accordance with various embodiments. The system 100 is shown to include a UE 101, which can be the same or similar to one or more other UEs discussed herein; a Third Generation Partnership Project (3GPP) Radio Access Network (Radio AN or RAN) or other (e.g., non-3GPP) AN, (R)AN 210, which can include one or more RAN nodes (e.g., Evolved Node B(s) (eNB(s)), next generation Node B(s) (gNB(s), and/or other nodes) or other nodes or access points; and a Data Network (DN) 203, which can be, for example, operator services, Internet access or third party services; and a Fifth Generation Core Network (5GC) 120. The 5GC 120 can comprise one or more of the following functions and network components: an Authentication Server Function (AUSF) 122; an Access and Mobility Management Function (AMF) 121; a Session Management Function (SMF) 124; a Network Exposure Function (NEF) 123; a Policy Control Function (PCF) 126; a Network Repository Function (NRF) 125; a Unified Data Management (UDM) 127; an Application Function (AF) 128; a User Plane (UP) Function (UPF) 102; and a Network Slice Selection Function (NSSF) 129.

The UPF 102 can act as an anchor point for intra-RAT and inter-RAT mobility, an external Protocol Data Unit (PDU) session point of interconnect to DN 103, and a branching point to support multi-homed PDU session. The UPF 102 can also perform packet routing and forwarding, perform packet inspection, enforce the user plane part of policy rules, lawfully intercept packets (UP collection), perform traffic usage reporting, perform QoS handling for a user plane (e.g., packet filtering, gating, Uplink (UL)/Downlink (DL) rate enforcement), perform Uplink Traffic verification (e.g., Service Data Flow (SDF) to QoS flow mapping), transport level packet marking in the uplink and downlink, and perform downlink packet buffering and downlink data notification triggering. UPF 102 can include an uplink classifier to support routing traffic flows to a data network. The DN 103 can represent various network operator services, Internet access, or third-party services. DN 103 can include, or be similar to, an application server. The UPF 102 can interact with the SMF 124 via an N4 reference point between the SMF 124 and the UPF 102.

The AUSF 122 can store data for authentication of UE 101 and handle authentication-related functionality. The AUSF 122 can facilitate a common authentication framework for various access types. The AUSF 122 can communicate with the AMF 121 via an N12 reference point between the AMF 121 and the AUSF 122; and can communicate with the UDM 127 via an N13 reference point between the UDM 127 and the AUSF 122. Additionally, the AUSF 122 can exhibit an Nausf service-based interface.

The AMF 121 can be responsible for registration management (e.g., for registering UE 101, etc.), connection management, reachability management, mobility management, and lawful interception of AMF-related events, and access authentication and authorization. The AMF 121 can be a termination point for the an N11 reference point between the AMF 121 and the SMF 124. The AMF 121 can provide transport for SM messages between the UE 101 and the SMF 124, and act as a transparent proxy for routing SM messages. AMF 121 can also provide transport for SMS messages between UE 101 and a Short Message Service (SMS) Function (SMSF) (not shown in FIG. 1). AMF 121 can act as SEcurity Anchor Function (SEAF), which can include interaction with the AUSF 122 and the UE 101 and/or receipt of an intermediate key that was established as a result of the UE 101 authentication process. Where Universal Subscriber Identity Module (USIM) based authentication is used, the AMF 121 can retrieve the security material from the AUSF 122. AMF 121 can also include a Single-Connection Mode (SCM) function, which receives a key from the SEA that it uses to derive access-network specific keys. Furthermore, AMF 121 can be a termination point of a RAN Control Plane (CP) interface, which can include or be an N2 reference point between the (R)AN 110 and the AMF 121; and the AMF 121 can be a termination point of Non Access Stratum (NAS) (N1) signaling, and perform NAS ciphering and integrity protection.

AMF 121 can also support NAS signaling with a UE 101 over an Non-3GPP (N3) Inter Working Function (IWF) interface. The N3IWF can be used to provide access to untrusted entities. N3IWF can be a termination point for the N2 interface between the (R)AN 110 and the AMF 121 for the control plane, and can be a termination point for the N3 reference point between the (R)AN 110 and the UPF 102 for the user plane. As such, the AMF 121 can handle N2 signaling from the SMF 124 and the AMF 121 for PDU sessions and QoS, encapsulate/de-encapsulate packets for Internet Protocol (IP) Security (IPSec) and N3 tunneling, mark N3 user-plane packets in the uplink, and enforce QoS corresponding to N3 packet marking taking into account QoS requirements associated with such marking received over N2. N3IWF can also relay uplink and downlink control-plane NAS signaling between the UE 101 and AMF 121 via an N1 reference point between the UE 101 and the AMF 121, and relay uplink and downlink user-plane packets between the UE 101 and UPF 102. The N3IWF also provides mechanisms for IPsec tunnel establishment with the UE 101. The AMF 121 can exhibit an Namf service-based interface, and can be a termination point for an N14 reference point between two AMFs 121 and an N17 reference point between the AMF 121 and a 5G Equipment Identity Register (5G-EIR) (not shown in FIG. 1).

The UE 101 can be registered with the AMF 121 in order to receive network services. Registration Management (RM) is used to register or deregister the UE 101 with the network (e.g., AMF 121), and establish a UE context in the network (e.g., AMF 121). The UE 101 can operate in an RM-REGISTERED state or an RM-DEREGISTERED state. In the RM-DEREGISTERED state, the UE 101 is not registered with the network, and the UE context in AMF 121 holds no valid location or routing information for the UE 101 so the UE 101 is not reachable by the AMF 121. In the RM-REGISTERED state, the UE 101 is registered with the network, and the UE context in AMF 121 can hold a valid location or routing information for the UE 101 so the UE 101 is reachable by the AMF 121. In the RM-REGISTERED state, the UE 101 can perform mobility Registration Update procedures, perform periodic Registration Update procedures triggered by expiration of the periodic update timer (e.g., to notify the network that the UE 101 is still active), and perform a Registration Update procedure to update UE capability information or to re-negotiate protocol parameters with the network, among others.

The AMF 121 can store one or more RM contexts for the UE 101, where each RM context is associated with a specific access to the network. The RM context can be a data structure, database object, etc. that indicates or stores, inter alia, a registration state per access type and the periodic update timer. The AMF 121 can also store a 5GC Mobility Management (MM) context that can be the same or similar to an (Enhanced Packet System (EPS))MM ((E)MM) context. In various embodiments, the AMF 121 can store a Coverage Enhancement (CE) mode B Restriction parameter of the UE 101 in an associated MM context or RM context. The AMF 121 can also derive the value, when needed, from the UE's usage setting parameter already stored in the UE context (and/or MM/RM context).

Connection Management (CM) can be used to establish and release a signaling connection between the UE 101 and the AMF 121 over the N1 interface. The signaling connection is used to enable NAS signaling exchange between the UE 101 and the CN 120, and comprises both the signaling connection between the UE and the AN (e.g., RRC connection or UE-N3IWF connection for non-3GPP access) and the N2 connection for the UE 101 between the AN (e.g., RAN 110) and the AMF 121. The UE 101 can operate in one of two CM states, CM-IDLE mode or CM-CONNECTED mode. When the UE 101 is operating in the CM-IDLE state/mode, the UE 101 may have no NAS signaling connection established with the AMF 121 over the N1 interface, and there can be (R)AN 110 signaling connection (e.g., N2 and/or N3 connections) for the UE 101. When the UE 101 is operating in the CM-CONNECTED state/mode, the UE 101 can have an established NAS signaling connection with the AMF 121 over the N1 interface, and there can be a (R)AN 110 signaling connection (e.g., N2 and/or N3 connections) for the UE 101. Establishment of an N2 connection between the (R)AN 110 and the AMF 121 can cause the UE 101 to transition from CM-IDLE mode to CM-CONNECTED mode, and the UE 101 can transition from the CM-CONNECTED mode to the CM-IDLE mode when N2 signaling between the (R)AN 110 and the AMF 121 is released.

The SMF 124 can be responsible for Session Management (SM) (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to Lawful Interception (LI) system); termination of SM parts of NAS messages; downlink data notification; initiating AN specific SM information, sent via AMF over N2 to AN; and determining Session and Service Continuity (SSC) mode of a session. SM can refer to management of a PDU session, and a PDU session or "session" can refer to a PDU connectivity service that provides or enables the exchange of PDUs between a UE 101 and a data network (DN) 103 identified by a Data Network Name (DNN). PDU sessions can be established upon UE 101 request, modified upon UE 101 and 5GC 120 request, and released upon UE 101 and 5GC 120 request using NAS SM signaling exchanged over the N1 reference point between the UE 101 and the SMF 124. Upon request from an application server, the 5GC 120 can trigger a specific application in the UE 101. In response to receipt of the trigger message, the UE 101 can pass the trigger message (or relevant parts/information of the trigger message) to one or more identified applications in the UE 101. The identified application(s) in the UE 101 can establish a PDU session to a specific DNN. The SMF 124 can check whether the UE 101 requests are compliant with user subscription information associated with the UE 101. In this regard, the SMF 124 can retrieve and/or request to receive update notifications on SMF 124 level subscription data from the UDM 127.

The SMF 124 can include the following roaming functionality: handling local enforcement to apply QoS Service Level Agreements (SLAs) (Visited Public Land Mobile Network (VPLMN)); charging data collection and charging interface (VPLMN); lawful intercept (in VPLMN for SM events and interface to LI system); and support for interaction with external DN for transport of signaling for PDU session authorization/authentication by external DN. An N16 reference point between two SMFs 124 can be included in the system 100, which can be between another SMF 124 in a visited network and the SMF 124 in the home network in roaming scenarios. Additionally, the SMF 124 can exhibit the Nsmf service-based interface.

The NEF 123 can provide means for securely exposing the services and capabilities provided by 3GPP network functions for third party, internal exposure/re-exposure, Application Functions (e.g., AF 128), edge computing or fog computing systems, etc. In such embodiments, the NEF 123 can authenticate, authorize, and/or throttle the AFs. NEF 123 can also translate information exchanged with the AF 128 and information exchanged with internal network functions. For example, the NEF 123 can translate between an AF-Service-Identifier and an internal 5GC information. NEF 123 can also receive information from other network functions (NFs) based on exposed capabilities of other network functions. This information can be stored at the NEF 123 as structured data, or at a data storage NF using standardized interfaces. The stored information can then be re-exposed by the NEF 123 to other NFs and AFs, and/or used for other purposes such as analytics. Additionally, the NEF 123 can exhibit an Nnef service-based interface.

The NRF 125 can support service discovery functions, receive NF discovery requests from NF instances, and provide the information of the discovered NF instances to the NF instances. NRF 125 also maintains information of available NF instances and their supported services. As used herein, the terms "instantiate," "instantiation," and the like can refer to the creation of an instance, and an "instance" can refer to a concrete occurrence of an object, which can occur, for example, during execution of program code. Additionally, the NRF 125 can exhibit the Nnrf service-based interface.

The PCF 126 can provide policy rules to control plane function(s) to enforce them, and can also support unified policy framework to govern network behavior. The PCF 126 can also implement an FE to access subscription information relevant for policy decisions in a UDR of the UDM 127. The PCF 126 can communicate with the AMF 121 via an N15 reference point between the PCF 126 and the AMF 121, which can include a PCF 126 in a visited network and the AMF 121 in case of roaming scenarios. The PCF 126 can communicate with the AF 128 via an N5 reference point between the PCF 126 and the AF 128; and with the SMF 124 via an N7 reference point between the PCF 126 and the SMF 124. The system 100 and/or CN 120 can also include an N24 reference point between the PCF 126 (in the home network) and a PCF 126 in a visited network. Additionally, the PCF 126 can exhibit an Npcf service-based interface.

The UDM 127 can handle subscription-related information to support the network entities' handling of communication sessions, and can store subscription data of UE 101. For example, subscription data can be communicated between the UDM 127 and the AMF 121 via an N8 reference point between the UDM 127 and the AMF. The UDM 127 can include two parts, an application Functional Entity (FE) and a Unified Data Repository (UDR) (the FE and UDR are not shown in FIG. 1). The UDR can store subscription data and policy data for the UDM 127 and the PCF 126, and/or structured data for exposure and application data (including Packet Flow Descriptions (PFDs) for application detection, application request information for multiple UEs 101) for the NEF 123. The Nudr service-based interface can be exhibited by the UDR 221 to allow the UDM 127, PCF 126, and NEF 123 to access a particular set of the stored data, as well as to read, update (e.g., add, modify), delete, and subscribe to notification of relevant data changes in the UDR. The UDM can include a UDM-FE, which is in charge of processing credentials, location management, subscription management and so on. Several different FEs can serve the same user in different transactions. The UDM-FE accesses subscription information stored in the UDR and performs authentication credential processing, user identification handling, access authorization, registration/mobility management, and subscription management. The UDR can interact with the SMF 124 via an N10 reference point between the UDM 127 and the SMF 124. UDM 127 can also support SMS management, wherein an SMS-FE implements similar application logic as discussed elsewhere herein. Additionally, the UDM 127 can exhibit the Nudm service-based interface.

The AF 128 can provide application influence on traffic routing, provide access to NEF 123, and interact with the policy framework for policy control. 5GC 120 and AF 128 can provide information to each other via NEF 123, which can be used for edge computing implementations. In such implementations, the network operator and third party services can be hosted close to the UE 101 access point of attachment to achieve an efficient service delivery through the reduced end-to-end latency and load on the transport network. For edge computing implementations, the 5GC can select a UPF 102 close to the UE 101 and execute traffic steering from the UPF 102 to DN 103 via the N6 interface. This can be based on the UE subscription data, UE location, and information provided by the AF 128. In this way, the AF 128 can influence UPF (re)selection and traffic routing. Based on operator deployment, when AF 128 is considered to be a trusted entity, the network operator can permit AF 128 to interact directly with relevant NFs. Additionally, the AF 128 can exhibit an Naf service-based interface.

The NSSF 129 can select a set of network slice instances serving the UE 101. The NSSF 129 can also determine allowed Network Slice Selection Assistance Information (NSSAI) and the mapping to the subscribed Single NSSAIs (S-NSSAIs), as appropriate. The NSSF 129 can also determine the AMF set to be used to serve the UE 101, or a list of candidate AMF(s) 121 based on a suitable configuration and possibly by querying the NRF 125. The selection of a set of network slice instances for the UE 101 can be triggered by the AMF 121 with which the UE 101 is registered by interacting with the NSSF 129, which can lead to a change of AMF 121. The NSSF 129 can interact with the AMF 121 via an N22 reference point between AMF 121 and NSSF 129; and can communicate with another NSSF 129 in a visited network via an N31 reference point (not shown in FIG. 1). Additionally, the NSSF 129 can exhibit an Nnssf service-based interface.

As discussed previously, the CN 120 can include an SMSF, which can be responsible for SMS subscription checking and verification, and relaying SM messages to/from the UE 101 to/from other entities, such as an SMS-Gateway Mobile services Switching Center (GMSC)/Inter-Working MSC (IWMSC)/SMS-router. The SMSF can also interact with AMF 121 and UDM 127 for a notification procedure that the UE 101 is available for SMS transfer (e.g., set a UE not reachable flag, and notifying UDM 127 when UE 101 is available for SMS).

The CN 120 can also include other elements that are not shown in FIG. 1, such as a Data Storage system/architecture, a 5G-EIR, a Security Edge Protection Proxy (SEPP), and the like. The Data Storage system can include a Structured Data Storage Function (SDSF), an Unstructured Data Storage Function (UDSF), and/or the like. Any NF can store and retrieve unstructured data into/from the UDSF (e.g., UE contexts), via N18 reference point between any NF and the UDSF (not shown in FIG. 1). Individual NFs can share a UDSF for storing their respective unstructured data or individual NFs can each have their own UDSF located at or near the individual NFs. Additionally, the UDSF can exhibit an Nudsf service-based interface (not shown in FIG. 1). The 5G-EIR can be an NF that checks the status of Permanent Equipment Identifier (PEI) for determining whether particular equipment/entities are blacklisted from the network; and the SEPP can be a non-transparent proxy that performs topology hiding, message filtering, and policing on inter-PLMN control plane interfaces.

Additionally, there can be many more reference points and/or service-based interfaces between the NF services in the NFs; however, these interfaces and reference points have been omitted from FIG. 1 for clarity. In one example, the CN 120 can include an Nx interface, which is an inter-CN interface between the MME (e.g., a non-5G MME) and the AMF 121 in order to enable interworking between CN 120 and a non-5G CN. Other example interfaces/reference points can include an N5g-EIR service-based interface exhibited by a 5G-EIR, an N27 reference point between the Network Repository Function (NRF) in the visited network and the NRF in the home network; and an N31 reference point between the NSSF in the visited network and the NSSF in the home network.

Figure 2:
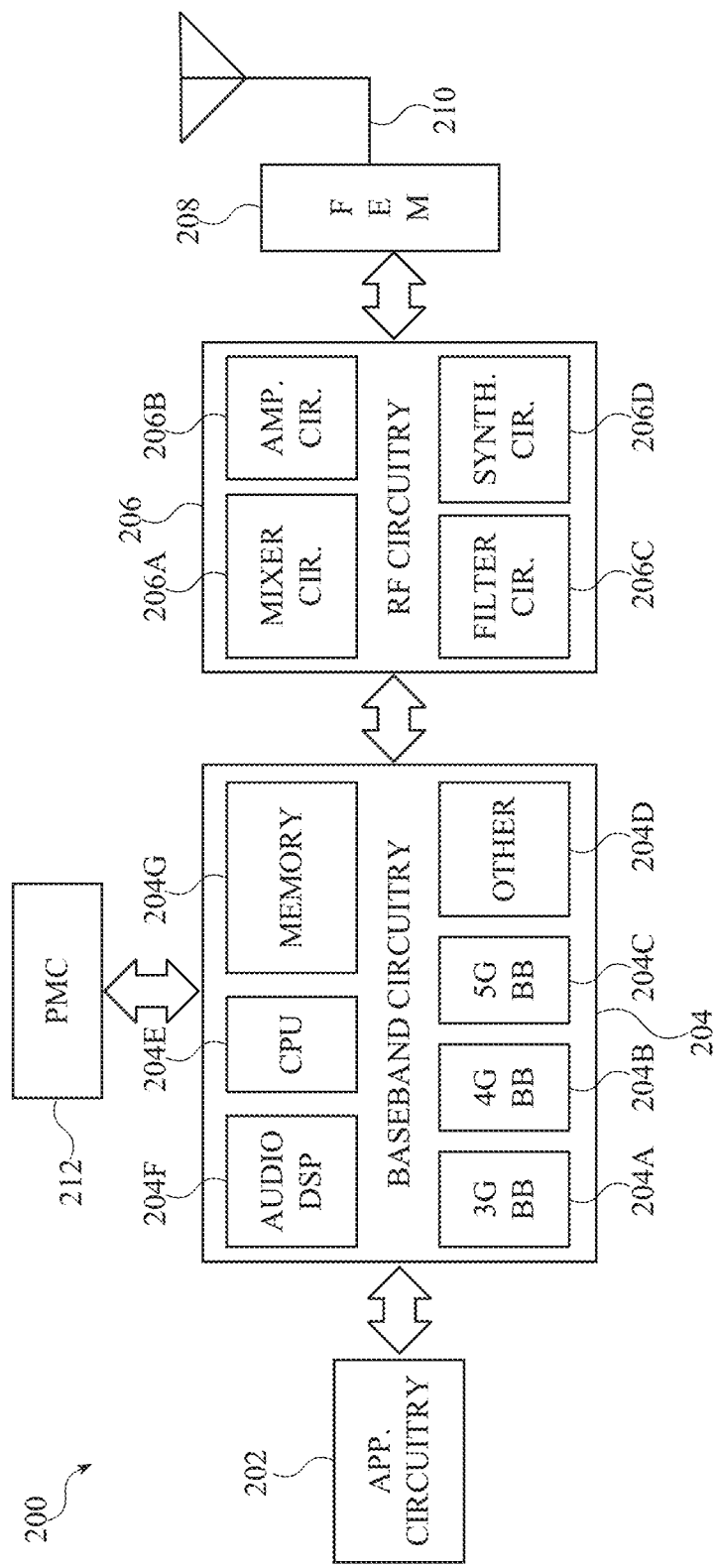
FIG. 2 is a diagram illustrating example components of a device that can be employed in accordance with various aspects discussed herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node. In some embodiments, the device 200 can include fewer elements (e.g., a RAN node may not utilize application circuitry 202, and instead include a processor/controller to process IP data received from a CN such as 5GC 120 or an Evolved Packet Core (EPC)). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tailbiting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with a NG-RAN, an evolved universal terrestrial radio access network (EUTRAN) or other wireless metropolitan area networks (WMAN), a wireless local area network (WLAN), a wireless personal area network (WPAN), etc. Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX)

after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
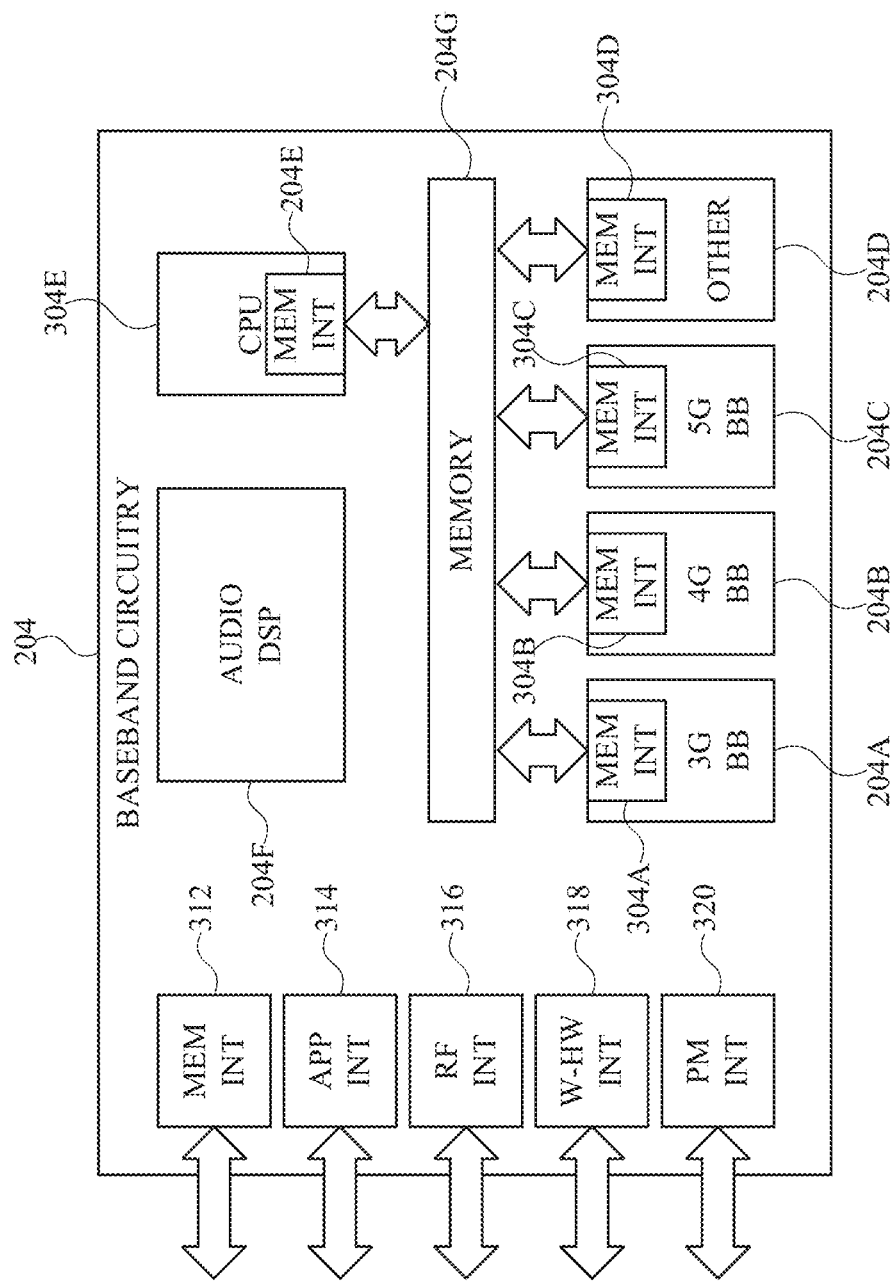
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

As discussed in greater detail herein, various embodiments, which can be employed, for example, at a UE, can facilitate a reduction in certain types of Radio Resource Control (RRC) signaling messages. Three different sets of techniques are discussed herein that can reduce RRC signaling messages, and various embodiments can employ one or more of these sets of techniques. A first set of techniques can be employed to reduce RRC messaging associated with RNA (RAN (Radio Access Network) Notification Area) update procedures in various scenarios. A second set of techniques can be employed to reduce RACH (Random Access Channel) requests from a RRC Idle Mode SIM (Subscriber Identity Module) of a UE in DSDS (Dual SIM Dual Standby) mode. A third set of techniques can be employed to reduce the number of RACH attempts to obtain NotBroadcasted SI(s) (System Information(s)) by a UE in response to a page message indicating SI modification.

Figure 4:
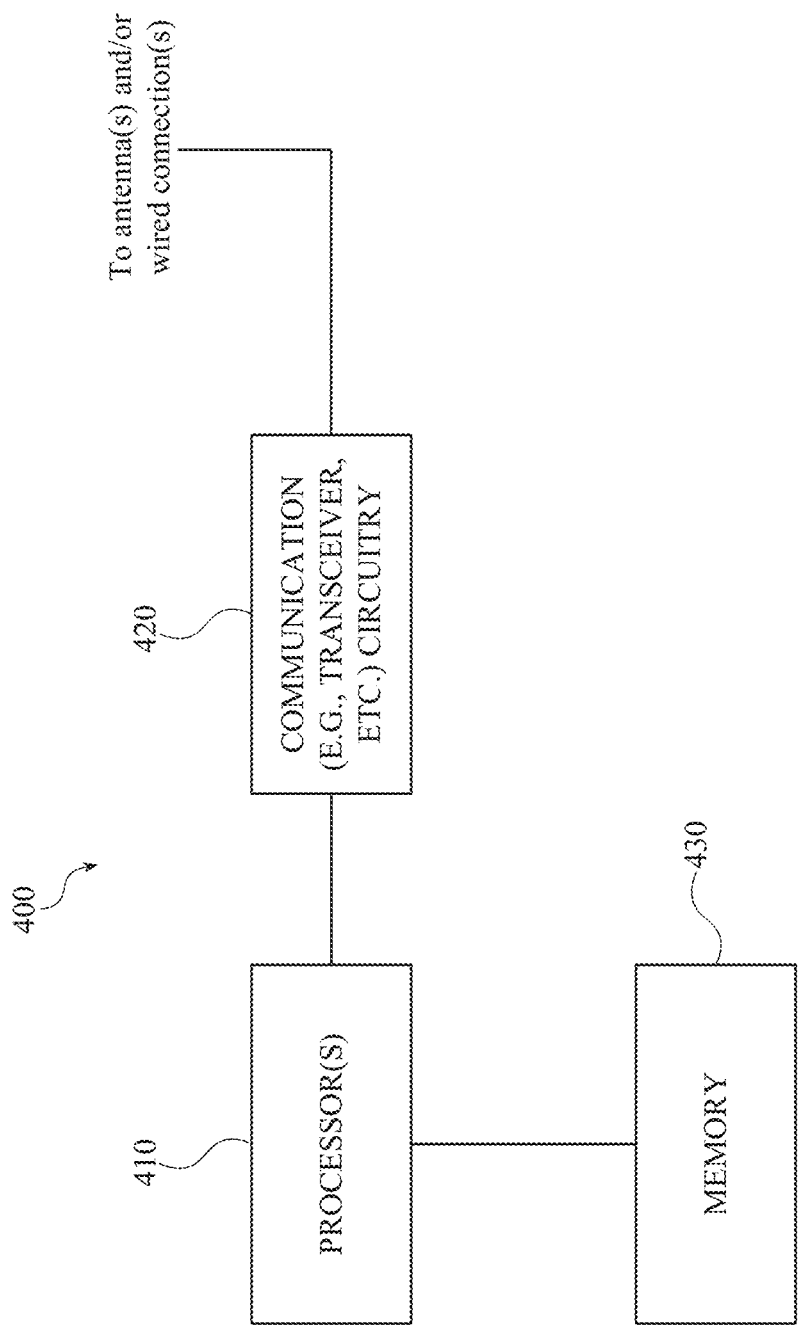
FIG. 4 is a block diagram illustrating a system that facilitates communication of Uplink Control Information based on an Enhanced Physical Uplink Control Channel (PUCCH) Format (EPF), according to various embodiments discussed herein.

Referring to FIG. 4, illustrated is a block diagram of a system 400 employable at a UE (User Equipment), a next generation Node B (gNodeB or gNB) or other BS (base station)/TRP (Transmit/Receive Point), or another component of a 3GPP (Third Generation Partnership Project) network (e.g., a 5GC (Fifth Generation Core Network)) component or function such as a UPF (User Plane Function)) that facilitates communication of Uplink Control Information based on an Enhanced Physical Uplink Control Channel (PUCCH) Format (EPF), according to various embodiments discussed herein. System 400 can include processor(s) 410, communication circuitry 420, and memory 430. Processor(s) 410 (e.g., which can comprise one or more of application circuitry 202 and/or 204A-204F, etc.) can comprise processing circuitry and associated interface(s) (e.g., a communication interface (e.g., RF circuitry interface 316) for communicating with communication circuitry 420, a memory interface (e.g., memory interface 312) for communicating with memory 430, etc.). Communication circuitry 420 can comprise, for example circuitry for wired and/or wireless connection(s) (e.g., 206 and/or 208), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 430 can comprise one or more memory devices (e.g., memory 204G, local memory (e.g., including CPU register(s)) of processor(s) discussed herein, etc.) which can be of any of a variety of storage mediums (e.g., volatile and/or non-volatile according to any of a variety of technologies/constructions, etc.), and can store instructions and/or data associated with one or more of processor(s) 410 or transceiver circuitry 420).

Specific types of embodiments of system 400 (e.g., UE embodiments) can be indicated via subscripts (e.g., system 400$_{UE}$ comprising processor(s) 410$_{UE}$, communication circuitry 420$_{UE}$, and memory 430$_{UE}$). In some embodiments, such as BS embodiments (e.g., system 400$_{gNB}$) and network component (e.g., UPF (User Plane Function), etc.) embodiments (e.g., system 400$_{UPF}$) processor(s) 410$_{gNB}$ (etc.), communication circuitry (e.g., 420$_{gNB}$, etc.), and memory (e.g., 430$_{gNB}$, etc.) can be in a single device or can be included in different devices, such as part of a distributed architecture. In embodiments, signaling or messaging between different embodiments of system 400 (e.g., 400$_1$ and 400$_2$) can be generated by processor(s) 410$_1$, transmitted by communication circuitry 420$_1$ over a suitable interface or reference point (e.g., a 3GPP air interface, N3, N4, etc.), received by communication circuitry 420$_2$, and processed by processor(s) 410$_2$. Depending on the type of interface, additional components (e.g., antenna(s), network port(s), etc. associated with system(s) 400$_1$ and 400$_2$) can be involved in this communication.

In various aspects discussed herein, signals and/or messages can be generated and output for transmission, and/or transmitted messages can be received and processed. Depending on the type of signal or message generated, outputting for transmission (e.g., by processor(s) 410, etc.)

can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping to one or more Resource Elements (REs) (e.g., a scheduled set of resources, a set of time and frequency resources granted for uplink transmission, etc.), wherein each RE can span one subcarrier in a frequency domain and one symbol in a time domain (e.g., wherein the symbol can be according to any of a variety of access schemes, e.g., Orthogonal Frequency Division Multiplexing (OFDM), Single Carrier Frequency Division Multiple Access (SC-FDMA), etc.). Depending on the type of received signal or message, processing (e.g., by processor(s) 410, etc.) can comprise one or more of: identifying physical resources associated with the signal/message, detecting the signal/message, resource element group deinterleaving, demodulation, descrambling, and/or decoding.

In various aspects, one or more of information (e.g., system information, resources associated with signaling, etc.), features, parameters, etc. can be configured to a UE via signaling (e.g., associated with one or more layers, such as L1 signaling or higher layer signaling (e.g., MAC, RRC, etc.)) from a gNB or other access point (e.g., via signaling generated by processor(s) $410_{gNB}$, transmitted by communication circuitry $420_{gNB}$, received by communication circuitry $420_{UE}$, and processed by processor(s) $410_{UE}$). Depending on the type of information, features, parameters, etc., the type of signaling employed and/or the exact details of the operations performed at the UE and/or gNB in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

For transmission on unlicensed band, the Occupied Channel Bandwidth (OCB) containing 99% of the power of signal should be between 80% and 100% of the declared Nominal Channel Bandwidth. To meet this OCB target, 3GPP agreed to support interlace mapping for Physical Uplink Control Channel (PUCCH) format (PF) 0/1/2/3 in RAN1 (RAN (Radio Access Network) WG1 (Working Group 1)) #97 meeting, via what is referred to as Enhanced PUCCH Format (EPF) 0/1/2/3 (EPF0/1/2/3).

A variety of design issues are still unresolved in terms of the design of enhanced PUCCH formats.

A first issue, for EPF0 and EPF1, is how cyclic shift value for each Physical Resource Block (PRB) will be mapped within a full interlace PUCCH transmission to meet the following metrics: (1) Minimizing the Peak-to-Average Power Ratio (PAPR) and Cubic Metric (CM) value to ensure the best cell coverage and (2) Maximizing UE multiplexing capacity and thereby minimizing UL signaling overhead.

A second issue arises from the interlaced nature of EPF transmissions. In Rel-15, PF0 and PF1 occupied only 1 RB to carry up to 2 bits. However, one interlace for EPF0/1 occupies 10 PRBs for 20 MHz. Assigning a full interlace for EPF0/1 to carry still 1 or 2 bits is very inefficient, and causes substantial signaling overhead that shrinks the cell coverage. Furthermore, support of partial interlace transmission is desirable to ensure the transmission possibility of PUCCH when a BandWidth Part (BWP) spans multiple LBT sub-band and only a subset of LBT sub-bands are available after LBT operations. There are several design aspects to be solved related to the second issue, including: (1) How to signal partial interlace position(s) for EPFs and (2) How to determine the resource mapping of a PUCCH transmission in scenarios wherein RB(s) between two LBT sub-bands of a Bandwidth Part (BWP) are reserved as guard band.

Various aspects can employ techniques discussed herein to address one or both of these issues. A first set of techniques discussed herein can be employed to determine Cyclic Shifts (CSs) for RBs of PUCCH with EPF0 or EPF1. A second set of techniques discussed herein can be employed to determine the resource mapping for a PUCCH transmission. Various embodiments can employ techniques of the first set of techniques, the second set of techniques, or both.

Cyclic Shift Determination for EPF0/EPF1

The first set of techniques relate to determination of cyclic shifts for Resource Blocks (RBs) of an interlace (e.g., a plurality of non-adjacent RBs having a fixed spacing between consecutive RBs of the interlace) of a PUCCH transmission with Enhanced PUCCH Format (EPF) 0 or EPF1. In various aspects, a UE can apply a cyclic shift to each RB of the interlace that can depend on one or more of an RB index of that RB, a Hybrid Automatic Repeat reQuest (HARQ)-Acknowledgment (ACK) feedback (e.g., associated with a Physical Downlink Shared Channel (PDSCH) scheduled via a Physical Downlink Control Channel (PDCCH)), or a value of a Scheduling Request (SR) bit (e.g., indicating positive SR or negative SR). In various aspects, the cyclic shifts of the RBs of the interlace can form a cyclic shift sequence, wherein the cyclic shift sequence can be uniquely associated with (and can thereby indicate) a set of values for the HARQ-ACK feedback and/or the SR bit.

In a first set of aspects, when a UE transmits a PUCCH with HARQ-ACK information using EPF0 or EPF1, the UE can determine the cyclic shift value for RB index i within one interlace according to equation (1):

$$m(i)=(m_0+i^*\Delta_{Shift}+6b_0+3b_1) \bmod 12, i=0,\ldots,N-1 \quad (1)$$

Wherein $\Delta_{Shift}$ is a step size parameter, which can be configured by higher layers as part of EPF0 and/or EPF1 configuration or can be broadcasted by one system information block (SIB) to all UEs in the cell and used before and after completion of RRC (Radio Resource Control) connection setup (in equation (1), as the only quantity multiplying i, $\Delta_{Shift}$ is the step size). N represents the number of RBs in the interlaced PUCCH resource. For EPF1, $m_0$ (e.g., an initial cyclic shift parameter, etc.) can be configured by higher layers, while for EPF0, $m_0$ can be determined based at least on the HARQ-ACK information to be transmitted. The first bit of HARQ-ACK feedback (or only bit, in scenarios involving 1-bit HARQ-ACK information) can be represented by $b_0$, and the second bit (if present) can be represented by $b_1$. In scenarios with only 1 bit of HARQ-ACK information, $b_1$ can be 0.

Figure 5:
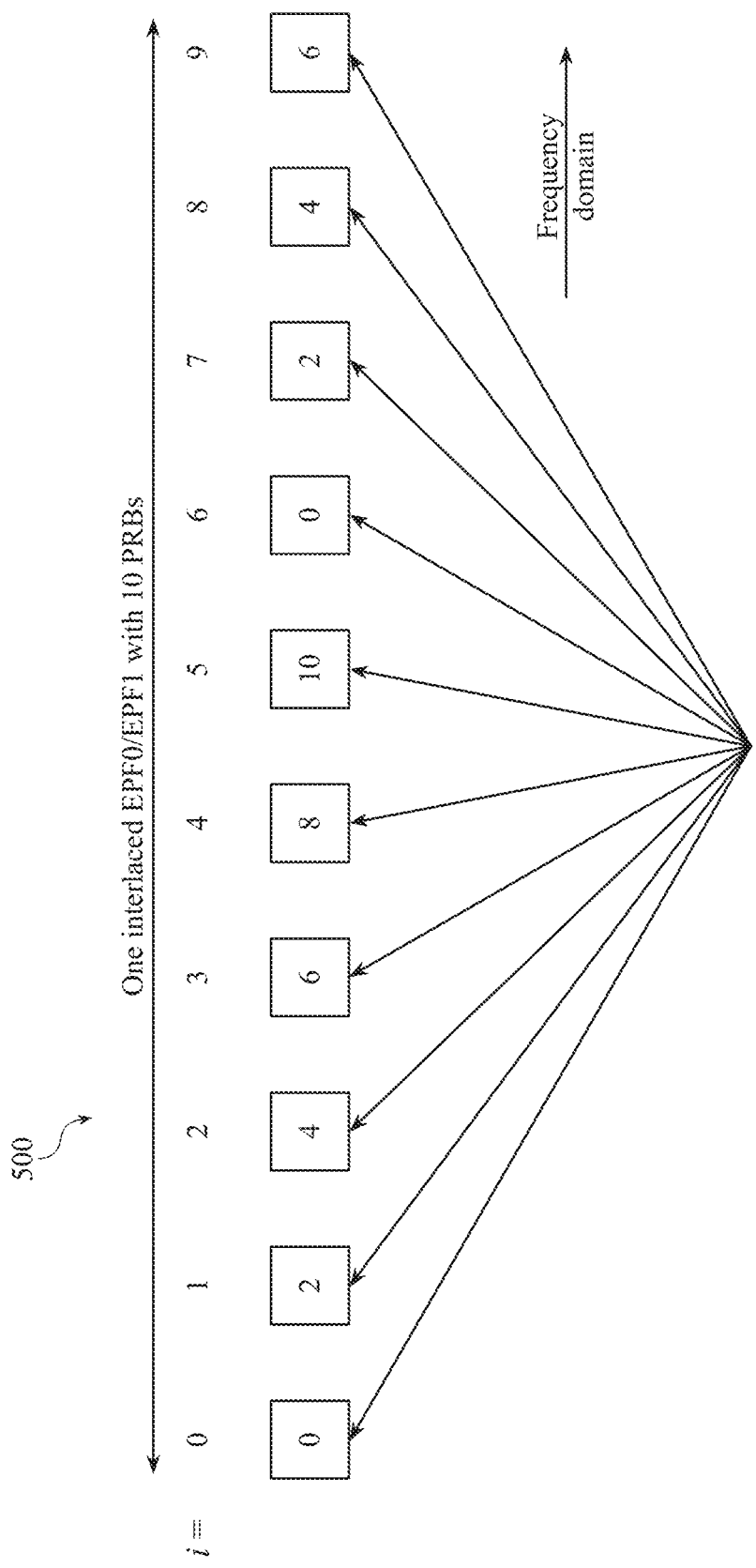
FIG. 5 is a diagram illustrating an example of Cyclic Shift (CS) mapping for one EPF0 or EPF1 interlace comprising 10 Physical Resource Blocks (PRBs), according to various embodiments discussed herein.

Referring to FIG. 5, illustrated is a diagram 500 showing an example of Cyclic Shift (CS) mapping for one EPF0 or EPF1 interlace comprising 10 PRBs (e.g., with 30 KHz subcarrier spacing), according to various aspects discussed herein. In FIG. 5, CSs are mapped to RBs based on equation (1), with $m_a=0$ and $\Delta_{Shift}=2$. As can be seen in FIG. 5, some values (e.g., 2) can result in CS value repetition across RBs in an interlace, a correspondingly larger PAPR/CM value, and coverage degradation. In various aspects, to minimize PAPR/CM values and improve coverage, $\Delta_{Shift} \in \{1, 5, 7, 11\}$ can be used to select a step value from among numbers co-prime with 12.

In a second set of aspects, CS selection for EPF0 can be determined based on the HARQ-ACK bit(s) and the SR bit, according to equation (2):

$$m(i)=(m_0+i*(\Delta_{Shift}+6*SR)+6b_0+3b_1) \bmod 12, i=0,\ldots,N-1 \quad (2)$$

Wherein SR=1 for positive SR and SR=0 for negative SR. In equation (2), the step size is $\Delta_{Shift}+6*SR$ (e.g., the step size is one of $\Delta_{Shift}$ or $\Delta_{Shift}+6$, depending on the value of SR).

Figure 6:
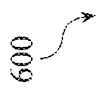
FIG. 6 is a diagram illustrating example Cyclic Shift (CS) mappings for different combinations of values for 1-bit Hybrid Automatic Repeat reQuest-Acknowledgment (HARQ-ACK) and 1-bit Scheduling Request (SR), according to various aspects discussed herein.

Referring to FIG. 6, illustrated is a diagram 600 showing example Cyclic Shift (CS) mappings for different combinations of values for 1-bit HARQ-ACK and 1-bit SR, according to various aspects discussed herein. In the example of FIG. 6, $m_0$, =0 and $\Delta_{Shift}$=1. As can be seen in FIG. 6, the state of the SR information (e.g., negative SR (N-SR) or positive SR (P-SR)) is indicated in the different step sizes employed for N-SR scenarios and P-SR scenarios. In scenarios with N-SR, a step size of $\Delta_{Shift}$ (equal to 1 in the example of FIG. 6) is used, while in scenarios with P-SR, a step size of $\Delta_{Shift}+6$ (equal to 7 in the example of FIG. 6) is used.

In a third set of aspects, CS selection for EPF0 can be determined based on the HARQ-ACK bit(s) and the SR bit, according to equation (3):

$$m(i,b_0)=(m_0+i*(\Delta_{Shift}+6*SR)+6b_0) \bmod 12, i=0,\ldots,N-1 \quad (3)$$

Depending on the values of the bit(s) of HARQ-ACK information and the bit of SR information, the CS sequence for the interlace can be according to table 1, below:

TABLE 1

Example Cyclic Shift Sequences based on HARQ-ACK and SR bits

| 2-bit HARQ-ACK | SR state | CS sequence for one interlace |
|---|---|---|
| ACK, ACK | Negative SR | $m(i, b_0), b_0 = 1$ |
| NACK, NACK | Negative SR | $m(i, b_0), b_0 = 0$ |
| ACK, NACK | Negative SR | $n(i) = \begin{cases} m(i, b_0 = 0) & i \bmod 2 = 0 \\ m(i, b_0 = 1) & i \bmod 2 = 1 \end{cases}$ |
| NACK, ACK | Negative SR | $k(i) = \begin{cases} m(i, b_0 = 0) & i \bmod 2 = 1 \\ m(i, b_0 = 1) & i \bmod 2 = 0 \end{cases}$ |
| ACK, ACK | Positive SR | $a(i) = \begin{cases} m(i, b_0 = 0) & i \bmod 3 = 0, 1 \\ m(i, b_0 = 1) & i \bmod 3 = 2 \end{cases}$ |
| NACK, NACK | Positive SR | $b(i) = \begin{cases} m(i, b_0 = 0) & i \bmod 3 = 2 \\ m(i, b_0 = 1) & i \bmod 3 = 0, 1 \end{cases}$ |
| ACK, NACK | Positive SR | $c(i) = \begin{cases} m(i, b_0 = 0) & i \bmod 5 = 0, 1, 2 \\ m(i, b_0 = 1) & i \bmod 5 = 3, 4 \end{cases}$ |
| NACK, ACK | Positive SR | $d(i) = \begin{cases} m(i, b_0 - 0) & i \bmod 5 - 3, 4 \\ m(i, b_0 = 1) & i \bmod 5 = 0, 1, 2 \end{cases}$ |

Referring to FIG. 7, illustrated is a diagram 700 showing example Cyclic Shift (CS) mappings for different combinations of values for 2-bit HARQ-ACK and 1-bit SR, according to various aspects discussed herein. In the example of FIG. 7 and in table 1, the top two rows of FIG. 7 and table 1 can be regarded as base CS sequences, with the top row (ACK, ACK, N-SR) indicated without shading and the second row (NACK, NACK, N-SR) indicated with shading, for reference. For each of the other rows, the CS value for each RB can be selected to correspond to the CS value of one of the two base sequences based on the pattern shown in FIG. 7 (wherein no shading indicates the value corresponds to that of the top row and shading indicates the value corresponds to that of the second row) and detailed in table 1.

Resource Mapping for PUCCH Formats

The second set of techniques can be employed for resource mapping in scenarios wherein a UE is configured with one or more BandWidth Parts (BWPs) that cover one or more listen-before-talk (LBT) sub-bands. In various aspects, the second set of aspects can be employed to determine the PUCCH resources ($r_{PUCCH}$) and the first PRB index for a PUCCH transmission ($n_{int}^{start}$). In one example, $r_{PUCCH}$ and $n_{int}^{start}$ can be determined according to equations (4):

$$r_{PUCCH} = \left\lfloor \frac{2n_{CCE,0}}{N_{CCE}} \right\rfloor + 2\Delta_{PRI} \quad (4)$$

$$n_{int}^{start} = RB_{SB,i}^{offset} + \lfloor r_{PUCCH}/N_{cs} \rfloor$$

Wherein $n_{CCE,0}$ is the index of a first Control Channel Element (CCE) for the PDCCH reception, $N_{CCE}$ is the number of CCEs in a Control Resource Set (CORESET) of a PDCCH reception, $\Delta_{PRI}$ can be a value indicated by a DCI format of the PDCCH, $RB_{SB,i}^{offset}$ is the RB offset for a LBT sub-band i, and $N_{CS}$ is the maximum number of cyclic shifts for the PUCCH. In some aspects, sub-band index i can be indicated by the DCI format(s) and can be based on the outcome of a LBT operation on different sub-bands of a BWP. In other aspects, in scenarios wherein PUCCH is transmitted within a UE-initiated COT, a default sub-band (e.g., the sub-band with lowest PRB index and successful LBT operation, etc.) can be selected by the UE for PUCCH resource determination.

In some aspects of this invention, the PUCCH interlaces can be indicated by a System Information Block (SIB), for example, SIB type 1 (SIB1).

Figure 8:
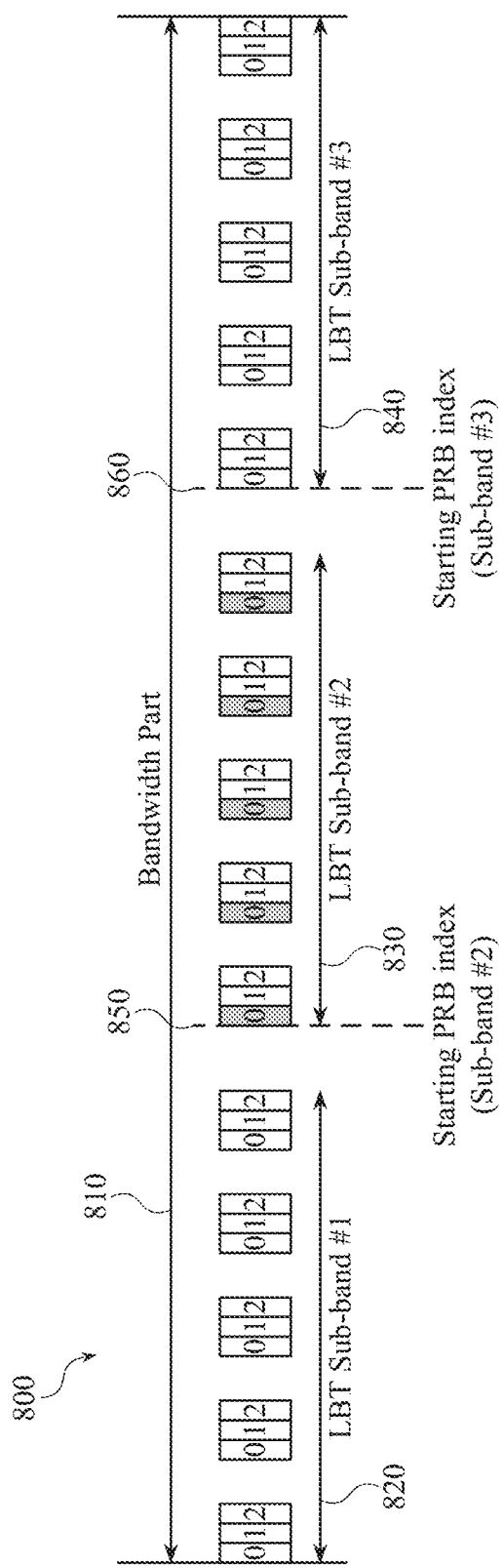
FIG. 8 is a diagram illustrating one example of a PUCCH resource mapping according to various aspects discussed herein.

Referring to FIG. 8, illustrated is a diagram 800 showing one example of a PUCCH resource mapping according to various aspects discussed herein. In the example of FIG. 8, for a given BWP 810 comprising three LBT sub-bands (820, 830, 840), the UE can transmit the PUCCH resource on LBT Sub-band #2 830 based on the sub-band value indicated in the DCI format (e.g., SBi=2), or alternately, based on a default UE selection for a UE-initiated COT. In addition, the UE can be configured with the sub-band location, for example, the starting PRB index 850 and/or 860 for sub-band #2 820 and/or sub-band #3 830, respectively.

In some aspects and/or scenarios, the unused PRBs in the guard band between two LBT sub-bands of one BWP may be indicated to a UE for PUCCH resource mapping. In such aspects, the UE can determine that a set of RBs in the guard bands are not available for one or more interlace(s) for a PUCCH transmission. In various such aspects, a PUCCH and/or PUSCH transmission can be one of punctured or rate-matched around these unused PRBs by the UE.

Additionally, in various aspects, for resource allocation of EPF2 and/or EPF3, one or more of the following can be configured to the UE in a resource configuration for one or more of EPF2 or EPF3: (a) One or more Sub-band index(s); (b) Starting interlace index(es); or (c) Number of interlaces.

Figure 9:
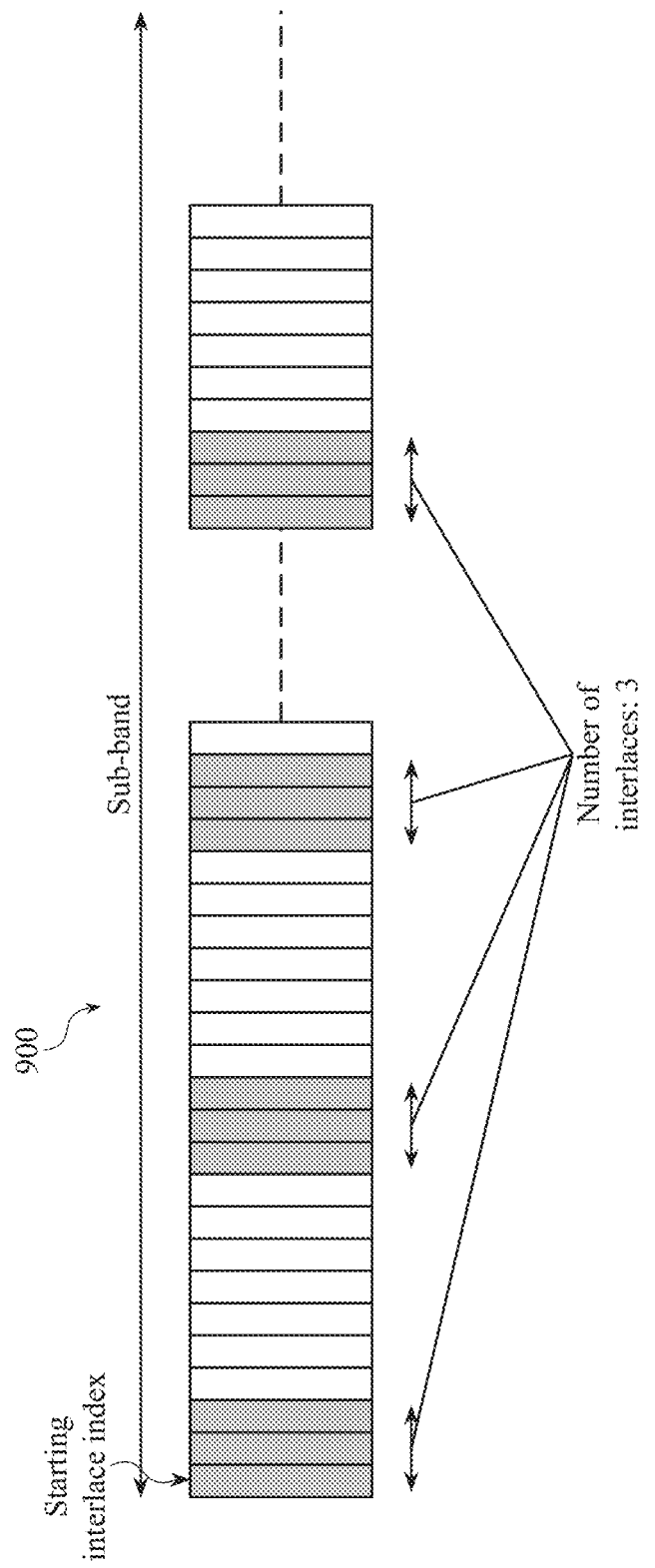
FIG. 9 is a diagram illustrating an example of a PUCCH resource allocation for one or more of EPF2 or EPF3, according to various aspects discussed herein.

Referring to FIG. 9, illustrated is a diagram 900 showing an example of a PUCCH resource allocation for one or more of EPF2 or EPF3, according to various aspects discussed herein. In the example of FIG. 9, a starting interlace index has been configured for the illustrated sub-band, along with three interlaces for PUCCH.

Additional Examples

Figure 10:
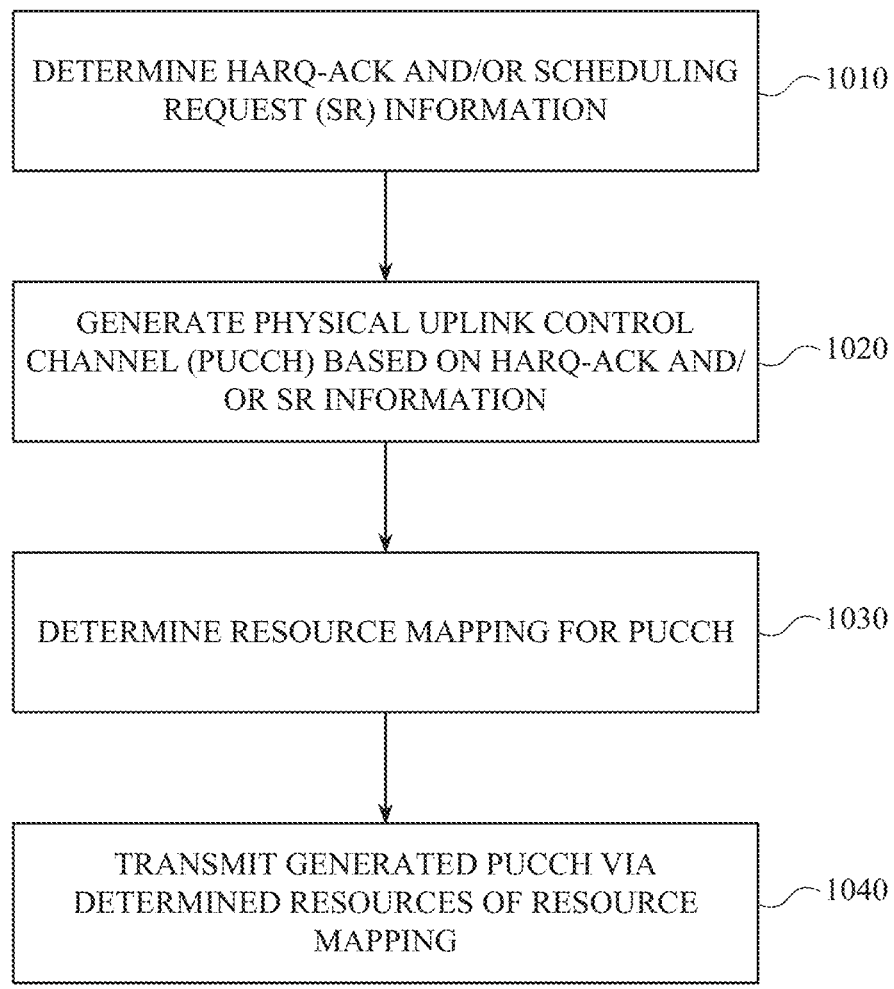
FIG. 10 is a flow diagram of an example method or process employable at a UE that facilitates UE transmission of PUCCH according to an Enhanced PUCCH Format, according to various embodiments discussed herein.

Referring to FIG. 10, illustrated is a flow diagram of an example method or process 1000 employable at a UE that facilitates UE transmission of PUCCH according to an Enhanced PUCCH Format, according to various embodiments discussed herein. In other aspects, a machine readable medium can store instructions associated with method 1000 that, when executed, can cause a UE (e.g., employing system $400_{UE}$) to perform the acts of method 1000.

At 1010, one or more of HARQ-ACK information (e.g., based on an associated Physical Downlink Shared Channel (PDSCH) transmission) or SR information (e.g., to request scheduling of a Physical Uplink Shared Channel (PUSCH) transmission) can be determined. In various embodiments, HARQ-ACK can comprise one or two bits (e.g., each of which can indicate an associated ACK or NACK), and SR can comprise one bit (e.g., which can indicate a positive SR when the UE is requesting scheduling for PUSCH and a negative SR when the UE is not requesting scheduling for PUSCH). Additionally, if the PUCCH At 1020, PUCCH can be generated based on the HARQ-ACK information and/or SR information. For EPF0 or EPF1, generating the PUCCH can comprise applying a cyclic shift to each RB of the PUCCH based at least in part on an RB index of that RB and one or more of the HARQ-ACK information or SR information, according to various aspects of the first set of techniques discussed herein.

At 1030, a resource mapping can be determined for the PUCCH, wherein the resource mapping can be to a set of PRBs comprising one or more interlaces. In various embodiments, the resource mapping can be based on a PUCCH resource and first PRB index for PUCCH determined by the UE according to various aspects of the second set of techniques discussed herein. In scenarios wherein the indicated or determined PRBs include at least one PRB of a guard band between LBT sub-bands, the UE can apply puncturing or rate-matching around the at least one PRB of the guard band. For EPF2 and/or EPF3, resource mapping can be based at least in part on one or more of the following that can be configured as part of a resource configuration for EPF2 and/or EPF3: one or more sub-band indexes, one or more starting interlace indexes, or a number of interlaces.

At 1040, the PUCCH generated at 1020 can be transmitted via the set of resources determined at 1030.

Additionally or alternatively, method 1000 can include one or more other acts described herein in connection with various embodiments of a UE and/or system $400_{UE}$.

Figure 11:
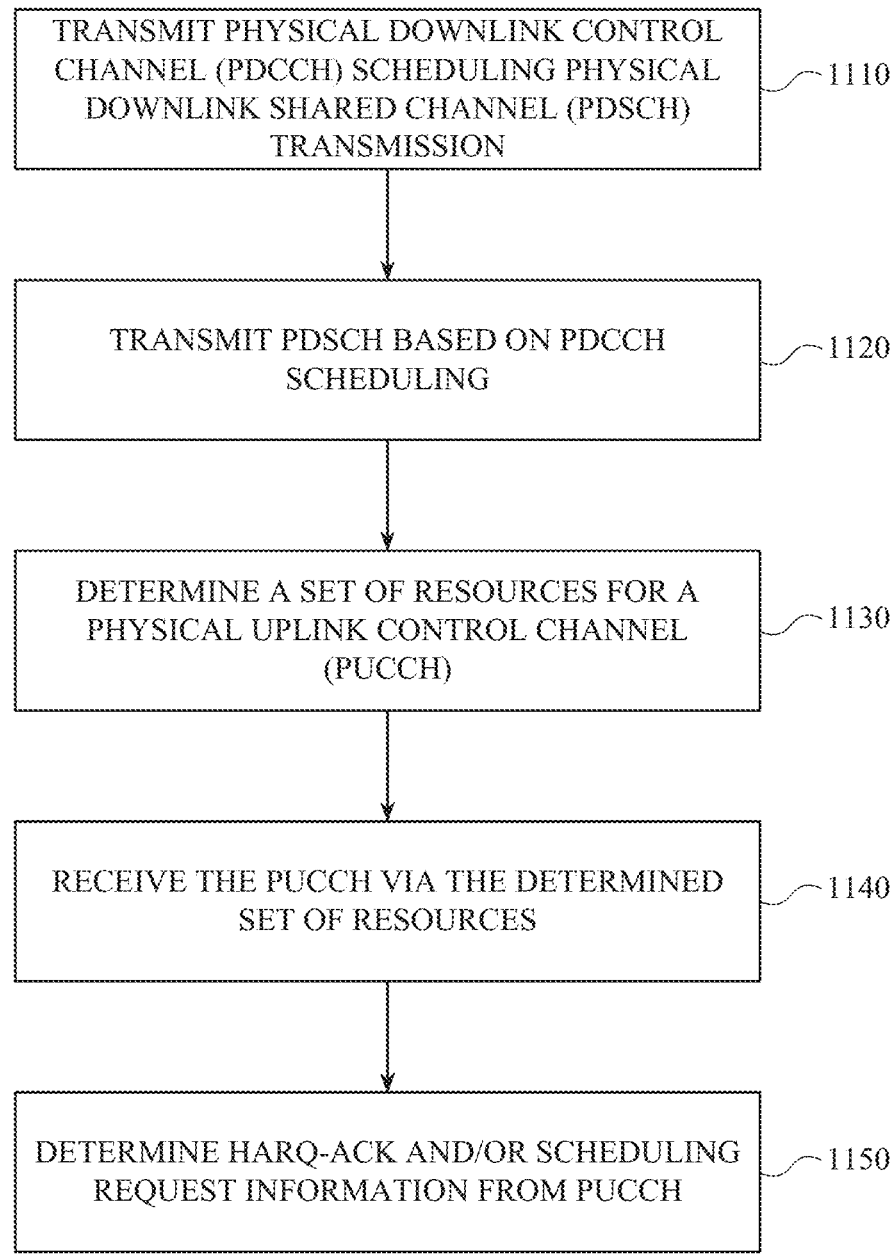
FIG. 11 is a flow diagram of an example method or process employable at a Base Station (BS) that facilitates BS reception of PUCCH according to an Enhanced PUCCH Format, according to various embodiments discussed herein.

Referring to FIG. 11, illustrated is a flow diagram of an example method or process 1100 employable at a Base Station (BS, e.g., next generation Node B (gNB), etc.) that facilitates BS reception of PUCCH according to an Enhanced PUCCH Format (EPF), according to various embodiments discussed herein. In other aspects, a machine readable medium can store instructions associated with method 1100 that, when executed, can cause a UE (e.g., employing a system $400_{BS}$, such as $400_{gNB}$, etc.) to perform the acts of method 1100.

At 1110, a Physical Downlink Control Channel (PDCCH) can be transmitted comprising one or more Downlink Control Information (DCI) messages, which can schedule at least one Physical Downlink Shared Channel (PDSCH) transmission to a UE. In various aspects, the PDCCH can explicitly (e.g., via a value $\Delta_{PRI}$ indicated by the DCI format, etc.) or implicitly (e.g., via the first CCE for PDCCH and/or number of CCEs in the CORESET, etc.) indicate one or more parameters that can determine the resource mapping of PUCCH associated with the PDSCH scheduled via the PDCCH.

At 1120, the PDSCH can be transmitted to the UE.

At 1130, a set of resources can be determined for the PUCCH associated with the PDSCH. In various aspects, the set of resources can comprise one or more interlaces that can be based on a PUCCH resource and first PRB index for PUCCH that can be determined by the BS (e.g., similarly to UE determination discussed above) according to various aspects of the second set of techniques discussed herein.

At 1140, the PUCCH can be received via the determined set of resources.

At 1150, HARQ-ACK information and/or Scheduling Request information can be determined based on the PUCCH. For EPF0 or EPF1, determining the HARQ-ACK information and/or the SR information can comprise determining a set of values for HARQ-ACK information and/or SR information that is uniquely associated with a cyclic shift pattern for the RBs of the at least one interlace of the PUCCH, according to various aspects of the first set of techniques discussed herein.

Additionally or alternatively, method 1100 can include one or more other acts described herein in connection with various embodiments of a BS and/or system $400_{BS}$.

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed in a User Equipment (UE), comprising: one or more processors configured to: determine Hybrid Automatic Repeat reQuest-Acknowledgment (HARQ-ACK) information; generate a Physical Uplink Control Channel (PUCCH) for a BandWidth Part (BWP) based at least in part on the HARQ-ACK information, wherein the PUCCH has an Enhanced PUCCH Format (EPF); determine a PUCCH resource for the PUCCH and a first PRB index for the PUCCH, wherein the PUCCH resource is determined based at least in part on an index of a first Control Channel Element (CCE) of an associated Physical Downlink Control Channel (PDCCH) and a number of CCEs in a Control Resource Set (CORESET) of the associated PDCCH; and map the PUCCH to at least one PUCCH interlace based on the PUCCH resource and the first PRB index for the PUCCH.

Example 2 comprises the subject matter of any variation of any of example(s) 1, wherein the PUCCH resource is determined based at least in part on a value indicated by a Downlink Control Information (DCI) format of the associated PDCCH.

Example 3 comprises the subject matter of any variation of any of example(s) 1-2, wherein the first PRB index for the PUCCH is based at least in part on the PUCCH resource and a Resource Block (RB) offset for a Listen-Before-Talk (LBT) sub-band of the BWP.

Example 4 comprises the subject matter of any variation of any of example(s) 3, wherein the LBT sub-band is indicated via a Downlink Control Information (DCI) format of the associated PDCCH.

Example 5 comprises the subject matter of any variation of any of example(s) 3, wherein the PUCCH is associated with a Channel Occupancy Time (COT) initiated by the UE, and wherein the LBT sub-band has a lowest RB index of one or more LBT sub-bands of the BWP for which a LBT operation was successful.

Example 6 comprises the subject matter of any variation of any of example(s) 1-5, wherein the at least one PUCCH interlace is at least one of a plurality of PUCCH interlaces indicated via a System Information Block Type 1 (SIB1) for the BWP.

Example 7 comprises the subject matter of any variation of any of example(s) 1-6, wherein the at least one PUCCH interlace comprises one or more RBs associated with a guard band between two Listen-Before-Talk (LBT) sub-bands, and wherein the one or more processors are further configured to one of puncture the at least one PUCCH interlace based on the one or more RBs associated with the guard band or perform rate-matching around the one or more RBs associated with the guard band.

Example 8 comprises the subject matter of any variation of any of example(s) 1-7, wherein the EPF is one of EPF2 or EPF3, and wherein a resource configuration for the EPF indicates one or more of: one or more sub-band indexes for the at least one interlace, a starting interlace index for a first interlace of the at least one interlace, or a number of interlaces of the at least one interlace.

Example 9 comprises the subject matter of any variation of any of example(s) 1-7, wherein the EPF is one of EPF0 or EPF1, and wherein the one or more processors being configured to generate the PUCCH comprises the one or more processors configured to apply an associated cyclic shift to each Resource Block (RB) of a plurality of RBs of the at least one interlace, wherein the associated cyclic shift for each RB of the plurality of RBs is based at least in part on the HARQ-ACK information.

Example 10 comprises the subject matter of any variation of any of example(s) 9, wherein the associated cyclic shift for each RB of the plurality of RBs is based at least in part on an initial cyclic shift parameter that is one of configured via higher layer signaling or determined based at least in part on the HARQ-ACK information.

Example 11 comprises the subject matter of any variation of any of example(s) 9-10, wherein the associated cyclic shift of a first RB of the plurality of RBs differs from the associated cyclic shift of a second consecutive RB of the plurality of RBs based on a step size, wherein the step size is based at least in part on a step size parameter that is configured via higher layer signaling.

Example 12 comprises the subject matter of any variation of any of example(s) 11, wherein the step size parameter is one of 1, 5, 7, or 11.

Example 13 comprises the subject matter of any variation of any of example(s) 11-12, wherein the step size is based at least in part on Scheduling Request (SR) information for the PUCCH.

Example 14 comprises the subject matter of any variation of any of example(s) 9-13, wherein the associated cyclic shifts for the plurality of RBs form a selected cyclic shift sequence of a plurality of distinct cyclic shift sequences, and wherein each cyclic shift sequence of the plurality of distinct cyclic shift sequences is associated with a distinct set of values for the HARQ-ACK information and Scheduling Request (SR) information.

Example 15 is a UE comprising the subject matter of any variation of any of example(s) 1-14.

Example 16 is an apparatus configured to be employed in a Base Station (BS), comprising: one or more processors configured to: generate a Physical Downlink Control Channel (PDCCH) scheduling a Physical Downlink Shared Channel (PDSCH) to a BandWidth Part (BWP); generate the PDSCH; determine, for a Physical Uplink Control Channel (PUCCH) associated with the PDSCH, a PUCCH resource and a first PRB index for the PUCCH, wherein the PUCCH resource is determined based at least in part on an index of a first Control Channel Element (CCE) of the PDCCH and a number of CCEs in a Control Resource Set (CORESET) of the PDCCH; process the PUCCH via a set of resources determined based at least in part on the PUCCH resource and the first PRB index for the PUCCH; and determine Hybrid Automatic Repeat reQuest-Acknowledgment (HARQ-ACK) information based at least in part on the processed PUCCH.

Example 17 comprises the subject matter of any variation of any of example(s) 16, wherein the PUCCH resource is determined based at least in part on a value indicated by a Downlink Control Information (DCI) format of the PDCCH.

Example 18 comprises the subject matter of any variation of any of example(s) 16-17, wherein the first PRB index for the PUCCH is based at least in part on the PUCCH resource and a Resource Block (RB) offset for a Listen-Before-Talk (LBT) sub-band of the BWP.

Example 19 comprises the subject matter of any variation of any of example(s) 18, wherein the LBT sub-band is indicated via a Downlink Control Information (DCI) format of the PDCCH.

Example 20 comprises the subject matter of any variation of any of example(s) 16-19, wherein the at least one PUCCH interlace is at least one of a plurality of PUCCH interlaces indicated via a System Information Block Type 1 (SIB1) for the BWP.

Example 21 comprises the subject matter of any variation of any of example(s) 16-20, wherein the at least one PUCCH interlace comprises one or more RBs associated with a guard band between two Listen-Before-Talk (LBT) sub-bands, and wherein the at least one PUCCH interlace is one of punctured based on the one or more RBs associated with the guard band or rate-matched around the one or more RBs associated with the guard band.

Example 22 comprises the subject matter of any variation of any of example(s) 16-21, wherein the EPF is one of EPF2 or EPF3, and wherein a resource configuration for the EPF indicates one or more of: one or more sub-band indexes for the at least one interlace, a starting interlace index for a first interlace of the at least one interlace, or a number of interlaces of the at least one interlace.

Example 23 comprises the subject matter of any variation of any of example(s) 16-21, wherein the EPF is one of EPF0 or EPF1, and wherein an associated cyclic shift is applied to each Resource Block (RB) of a plurality of RBs of the at least one interlace, wherein the associated cyclic shift for each RB of the plurality of RBs is based at least in part on the HARQ-ACK information.

Example 24 comprises the subject matter of any variation of any of example(s) 23, wherein the associated cyclic shift for each RB of the plurality of RBs is based at least in part on an initial cyclic shift parameter that is one of configured via higher layer signaling or determined based at least in part on the HARQ-ACK information.

Example 25 comprises the subject matter of any variation of any of example(s) 23-24, wherein the associated cyclic shift of a first RB of the plurality of RBs differs from the associated cyclic shift of a second consecutive RB of the plurality of RBs based on a step size, wherein the step size is based at least in part on a step size parameter that is configured via higher layer signaling.

Example 26 comprises the subject matter of any variation of any of example(s) 25, wherein the step size parameter is one of 1, 5, 7, or 11.

Example 27 comprises the subject matter of any variation of any of example(s) 25-26, wherein the step size is based at least in part on Scheduling Request (SR) information for the PUCCH.

Example 28 comprises the subject matter of any variation of any of example(s) 23-27, wherein the associated cyclic shifts for the plurality of RBs form a selected cyclic shift sequence of a plurality of distinct cyclic shift sequences, and wherein each cyclic shift sequence of the plurality of distinct cyclic shift sequences is associated with a distinct set of values for the HARQ-ACK information and Scheduling Request (SR) information.

Example 29 comprises the subject matter of any variation of any of example(s) 16-28, wherein the BS is a next generation Node B (gNB).

Example 30 is a machine-readable medium comprising instructions that, when executed, cause a User Equipment (UE) to: determine Hybrid Automatic Repeat reQuest-Acknowledgment (HARQ-ACK) information; generate a Physical Uplink Control Channel (PUCCH) for a BandWidth Part (BWP) based at least in part on the HARQ-ACK information, wherein the PUCCH has an Enhanced PUCCH Format (EPF); determine a PUCCH resource for the PUCCH and a first PRB index for the PUCCH, wherein the PUCCH resource is determined based at least in part on an index of a first Control Channel Element (CCE) of an associated Physical Downlink Control Channel (PDCCH) and a number of CCEs in a Control Resource Set (CORESET) of the associated PDCCH; and map the PUCCH to at least one PUCCH interlace based on the PUCCH resource and the first PRB index for the PUCCH.

Example 31 comprises the subject matter of any variation of any of example(s) 30, wherein the PUCCH resource is determined based at least in part on a value indicated by a Downlink Control Information (DCI) format of the associated PDCCH.

Example 32 comprises the subject matter of any variation of any of example(s) 30-31, wherein the first PRB index for the PUCCH is based at least in part on the PUCCH resource and a Resource Block (RB) offset for a Listen-Before-Talk (LBT) sub-band of the BWP.

Example 33 comprises the subject matter of any variation of any of example(s) 32, wherein the LBT sub-band is indicated via a Downlink Control Information (DCI) format of the associated PDCCH.

Example 34 comprises the subject matter of any variation of any of example(s) 32, wherein the PUCCH is associated with a Channel Occupancy Time (COT) initiated by the UE, and wherein the LBT sub-band has a lowest RB index of one or more LBT sub-bands of the BWP for which a LBT operation was successful.

Example 35 comprises the subject matter of any variation of any of example(s) 30-34, wherein the at least one PUCCH interlace is at least one of a plurality of PUCCH interlaces indicated via a System Information Block Type 1 (SIB1) for the BWP.

Example 36 comprises the subject matter of any variation of any of example(s) 30-35, wherein the at least one PUCCH interlace comprises one or more RBs associated with a guard band between two Listen-Before-Talk (LBT) sub-bands, and wherein the instructions, when executed, further cause the UE to one of puncture the at least one PUCCH interlace based on the one or more RBs associated with the guard band or perform rate-matching around the one or more RBs associated with the guard band.

Example 37 comprises the subject matter of any variation of any of example(s) 30-36, wherein the EPF is one of EPF2 or EPF3, and wherein a resource configuration for the EPF indicates one or more of: one or more sub-band indexes for the at least one interlace, a starting interlace index for a first interlace of the at least one interlace, or a number of interlaces of the at least one interlace.

Example 38 comprises the subject matter of any variation of any of example(s) 30-36, wherein the EPF is one of EPF0 or EPF1, and wherein generating the PUCCH comprises applying an associated cyclic shift to each Resource Block (RB) of a plurality of RBs of the at least one interlace, wherein the associated cyclic shift for each RB of the plurality of RBs is based at least in part on the HARQ-ACK information.

Example 39 comprises the subject matter of any variation of any of example(s) 38, wherein the associated cyclic shift for each RB of the plurality of RBs is based at least in part on an initial cyclic shift parameter that is one of configured via higher layer signaling or determined based at least in part on the HARQ-ACK information.

Example 40 comprises the subject matter of any variation of any of example(s) 38-39, wherein the associated cyclic shift of a first RB of the plurality of RBs differs from the associated cyclic shift of a second consecutive RB of the plurality of RBs based on a step size, wherein the step size is based at least in part on a step size parameter that is configured via higher layer signaling.

Example 41 comprises the subject matter of any variation of any of example(s) 40, wherein the step size parameter is one of 1, 5, 7, or 11.

Example 42 comprises the subject matter of any variation of any of example(s) 40-41, wherein the step size is based at least in part on Scheduling Request (SR) information for the PUCCH.

Example 43 comprises the subject matter of any variation of any of example(s) 40-42, wherein the associated cyclic shifts for the plurality of RBs form a selected cyclic shift sequence of a plurality of distinct cyclic shift sequences, and wherein each cyclic shift sequence of the plurality of distinct cyclic shift sequences is associated with a distinct set of values for the HARQ-ACK information and Scheduling Request (SR) information.

Example 44 is a machine-readable medium comprising instructions that, when executed, cause a Base Station (BS) to: transmit a Physical Downlink Control Channel (PDCCH) scheduling a Physical Downlink Shared Channel (PDSCH) to a BandWidth Part (BWP); transmit the PDSCH; determine, for a Physical Uplink Control Channel (PUCCH) associated with the PDSCH, a PUCCH resource and a first PRB index for the PUCCH, wherein the PUCCH resource is determined based at least in part on an index of a first Control Channel Element (CCE) of the PDCCH and a number of CCEs in a Control Resource Set (CORESET) of the PDCCH; receive the PUCCH via a set of resources determined based at least in part on the PUCCH resource and the first PRB index for the PUCCH; and determine Hybrid Automatic Repeat reQuest-Acknowledgment (HARQ-ACK) information based at least in part on the processed PUCCH.

Example 45 comprises the subject matter of any variation of any of example(s) 44, wherein the PUCCH resource is determined based at least in part on a value indicated by a Downlink Control Information (DCI) format of the PDCCH.

Example 46 comprises the subject matter of any variation of any of example(s) 44-45, wherein the first PRB index for the PUCCH is based at least in part on the PUCCH resource and a Resource Block (RB) offset for a Listen-Before-Talk (LBT) sub-band of the BWP.

Example 47 comprises the subject matter of any variation of any of example(s) 46, wherein the LBT sub-band is indicated via a Downlink Control Information (DCI) format of the PDCCH.

Example 48 comprises the subject matter of any variation of any of example(s) 44-47, wherein the at least one PUCCH interlace is at least one of a plurality of PUCCH interlaces indicated via a System Information Block Type 1 (SIB1) for the BWP.

Example 49 comprises the subject matter of any variation of any of example(s) 44-48, wherein the at least one PUCCH interlace comprises one or more RBs associated with a guard band between two Listen-Before-Talk (LBT) sub-bands, and wherein the at least one PUCCH interlace is one of punctured based on the one or more RBs associated with the guard band or rate-matched around the one or more RBs associated with the guard band.

Example 50 comprises the subject matter of any variation of any of example(s) 44-49, wherein the EPF is one of EPF2 or EPF3, and wherein a resource configuration for the EPF indicates one or more of: one or more sub-band indexes for the at least one interlace, a starting interlace index for a first interlace of the at least one interlace, or a number of interlaces of the at least one interlace.

Example 51 comprises the subject matter of any variation of any of example(s) 44-49, wherein the EPF is one of EPF0 or EPF1, and wherein an associated cyclic shift is applied to each Resource Block (RB) of a plurality of RBs of the at least one interlace, wherein the associated cyclic shift for each RB of the plurality of RBs is based at least in part on the HARQ-ACK information.

Example 52 comprises the subject matter of any variation of any of example(s) 51, wherein the associated cyclic shift for each RB of the plurality of RBs is based at least in part on an initial cyclic shift parameter that is one of configured via higher layer signaling or determined based at least in part on the HARQ-ACK information.

Example 53 comprises the subject matter of any variation of any of example(s) 51-52, wherein the associated cyclic shift of a first RB of the plurality of RBs differs from the associated cyclic shift of a second consecutive RB of the plurality of RBs based on a step size, wherein the step size is based at least in part on a step size parameter that is configured via higher layer signaling.

Example 54 comprises the subject matter of any variation of any of example(s) 53, wherein the step size parameter is one of 1, 5, 7, or 11.

Example 55 comprises the subject matter of any variation of any of example(s) 53-54, wherein the step size is based at least in part on Scheduling Request (SR) information for the PUCCH.

Example 56 comprises the subject matter of any variation of any of example(s) 51-55, wherein the associated cyclic shifts for the plurality of RBs form a selected cyclic shift sequence of a plurality of distinct cyclic shift sequences, and wherein each cyclic shift sequence of the plurality of distinct cyclic shift sequences is associated with a distinct set of values for the HARQ-ACK information and Scheduling Request (SR) information.

Example 57 comprises an apparatus comprising means for executing any of the described operations of examples 1-56.

Example 58 comprises a machine readable medium that stores instructions for execution by a processor to perform any of the described operations of examples 1-56.

Example 59 comprises an apparatus comprising: a memory interface; and processing circuitry configured to: perform any of the described operations of examples 1-56.

Example 60 comprises a User Equipment (UE) configured to execute any of the described operations of examples 1-15 or 30-43.

Example 61 comprises a Base Station (BS) configured to execute any of the described operations of examples 16-29 or 44-56.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in a User Equipment (UE), comprising:
one or more processors configured to:
determine Hybrid Automatic Repeat reQuest-Acknowledgment (HARQ-ACK) information;
generate a Physical Uplink Control Channel (PUCCH) for a BandWidth Part (BWP) based at least in part on the HARO-ACK information, wherein the PUCCH has an Enhanced PUCCH Format (EPF);
determine a PUCCH resource for the PUCCH and a first Physical Resource Block (PRB) index for the PUCCH, wherein the PUCCH resource is determined based at least in part on an index of a first Control Channel Element (CCE) of an associated Physical Downlink Control Channel (PDCCH) and a number of CCEs in a Control Resource Set (CORESET) of the associated PDCCH;

map the PUCCH to at least one PUCCH interlace based on the PUCCH resource and the first PRB index for the PUCCH; and determine a cyclic shift value for each Resource Block (RB) of a plurality of RBs within the at least one PUCCH interlace depending on an RB index of the RB, wherein the cyclic shift value in part depends on a first bit $b_0$ of the HARO-ACK information and a second bit $b_1$ of the HARO-ACK information, the EPF is EPF0, and the cyclic shift value in part depends on $6b_0$ plus $3b_1$.

2. The apparatus of claim 1, wherein the PUCCH resource is determined based at least in part on a value indicated by a Downlink Control Information (DCI) format of the associated PDCCH.

3. The apparatus of claim 1, wherein the first PRB index for the PUCCH is based at least in part on the PUCCH resource and a Resource Block (RB) offset for a Listen-Before-Talk (LBT) sub-band of the BWP.

4. The apparatus of claim 3, wherein the LBT sub-band is indicated via a Downlink Control Information (DCI) format of the associated PDCCH.

5. The apparatus of claim 3, wherein the PUCCH is associated with a Channel Occupancy Time (COT) initiated by the UE, and wherein the LBT sub-band has a lowest RB index of one or more LBT sub-bands of the BWP for which a LBT operation was successful.

6. The apparatus of any of claim 1, wherein the at least one PUCCH interlace is at least one of a plurality of PUCCH interlaces indicated via a System Information Block Type 1 (SIB1) for the BWP.

7. The apparatus of any of claim 1, wherein the at least one PUCCH interlace comprises one or more of the plurality of RBs associated with a guard band between two Listen-Before-Talk (LBT) sub-bands, and wherein the one or more processors are further configured to one of puncture the at least one PUCCH interlace based on one or more of the plurality of RBs associated with the guard band or perform rate matching around the one or more of the plurality of RBs associated with the guard band.

8. The apparatus of any of claim 1, wherein a resource configuration for the EPF indicates one or more of: one or more sub-band indexes for the at least one PUCCH interlace, a starting interlace index for a first interlace of the at least one PUCCH interlace, or a number of interlaces of the at least one PUCCH interlace.

9. The apparatus of any of claim 1, wherein the one or more processors are configured to generate the PUCCH comprises the one or more processors configured to apply an associated cyclic shift to each RB of the plurality of RBs of the at least one PUCCH interlace.

10. The apparatus of claim 9, wherein the associated cyclic shift for each RB of the plurality of RBs is based at least in part on an initial cyclic shift parameter that is one of configured via higher layer signaling or determined based at least in part on the HARO-ACK information.

11. The apparatus of claim 9, wherein the associated cyclic shift of a first RB of the plurality of RBs differs from the associated cyclic shift of a second consecutive RB of the plurality of RBs based on a step size, wherein the step size is based at least in part on a step size parameter that is configured via higher layer signaling.

12. The apparatus of claim 11, wherein the step size parameter is one of 1, 5, 7, or 11.

13. The apparatus of claim 11, wherein the step size is based at least in part on Scheduling Request (SR) information for the PUCCH.

14. The apparatus of claim 9, wherein the associated cyclic shifts for the plurality of RBs form a selected cyclic shift sequence of a plurality of distinct cyclic shift sequences, and wherein each cyclic shift sequence of the plurality of distinct cyclic shift sequences is associated with a distinct set of values for the HARO-ACK information and Scheduling Request (SR) information.

15. An apparatus configured to be employed in a Base Station (BS), comprising:
one or more processors configured to:
generate a Physical Downlink Control Channel (PDCCH) scheduling a Physical Downlink Shared Channel (PDSCH) to a BandWidth Part (BWP);
generate the PDSCH;
determine, for a Physical Uplink Control Channel (PUCCH) associated with the PDSCH, a PUCCH resource and a first PRB index for the PUCCH, wherein the PUCCH resource is determined based at least in part on an index of a first Control Channel Element (CCE) of the PDCCH and a number of CCEs in a Control Resource Set (CORESET) of the PDCCH;
process the PUCCH via a set of resources determined based at least in part on the PUCCH resource and the first PRB index for the PUCCH, wherein a cyclic shift value for each Resource Block (RB) of a plurality of RBs within at least one PUCCH interlace is based on an RB index of the RB, wherein the cyclic shift value in part depends on a first bit $b_0$ of the HARO-ACK information and a second bit $b_1$ of the HARO-ACK information, the PUCCH has an Enhanced PUCCH Format (EPF) of EPF0, and the cyclic shift value in part depends on $6b_0$ plus $3b_1$; and
determine Hybrid Automatic Repeat reQuest-Acknowledgment (HARQ-ACK) information based at least in part on the processed PUCCH.

16. A baseband processor of a User Equipment (UE), the baseband processor configured to perform operations comprising:
transmitting a Physical Uplink Control Channel (PUCCH) with Hybrid Automatic Repeat reQuest-Acknowledgment (HARO-ACK) information, wherein the PUCCH has an Enhanced PUCCH Format (EPF); and
determining a cyclic shift value for a Resource Block (RB) of a plurality of RBs within one interlace depending on an RB index of the RB, wherein:
the cyclic shift value in part depends on a first bit b0 of the HARO-ACK information and a second bit b1 of the HARO-ACK information,
the EPF is EPF0, and
the cyclic shift value in part depends on $6b_0$ plus $3b_1$.

17. The baseband processor of claim 16, wherein a first cyclic shift value of a first RB of the plurality of RBs differs from a second cyclic shift value of a second consecutive RB of the plurality of RBs based on a step size parameter.

18. The baseband processor of claim 17, wherein the step size parameter is one of 1, 5, 7, or 11.

* * * * *

UNITED STATES PATENT AND TRADEMARK OFFICE
CERTIFICATE OF CORRECTION

PATENT NO. : 12,213,144 B2  
APPLICATION NO. : 17/442644  
DATED : January 28, 2025  
INVENTOR(S) : Yushu Zhang et al.

Page 1 of 1

It is certified that error appears in the above-identified patent and that said Letters Patent is hereby corrected as shown below:

In the Claims
In Column 26, Line 64, Claim 1, please delete "HARO-ACK" and insert --HARQ-ACK--.
In Column 27, Line 14, Claim 1, please delete "HARO-ACK" and insert --HARQ-ACK--.
In Column 27, Line 15, Claim 1, please delete "HARO-ACK" and insert --HARQ-ACK--.
In Column 27, Line 24, Claim 3, please delete "a Resource Block (RB)" and insert --an RB--.
In Column 27, Line 34, Claim 6, please delete "of any".
In Column 27, Line 38, Claim 7, please delete "of any".
In Column 27, Line 47, Claim 8, please delete "of any".
In Column 27, Line 53, Claim 9, please delete "of any".
In Column 27, Line 54, Claim 9, please delete "are".
In Column 27, Line 62, Claim 10, please delete "HARO-ACK" and insert --HARQ-ACK--.
In Column 28, Line 13, Claim 14, please delete "HARO-ACK" and insert --HARQ-ACK--.
In Column 28, Line 24, Claim 15, please delete "PRB" and insert --physical resource block (PRB)--.
In Column 28, Line 35, Claim 15, please delete "the HARO-ACK" and insert --hybrid automatic repeat request acknowledgment (HARQ-ACK)--.
In Column 28, Line 36, Claim 15, please delete "HARO-ACK" and insert --HARQ-ACK--.
In Column 28, Line 40, Claim 15, please delete "Hybrid Automatic Repeat reQuest Acknowledgement (HARQ-ACK)" and insert --the HARQ-ACK--.
In Column 28, Line 48, Claim 16, please delete "HARO-ACK" and insert --HARQ-ACK--.
In Column 28, Line 54, Claim 16, please delete "b0 of the HARO-ACK" and insert --$b_0$ of the HARQ-ACK--.
In Column 28, Line 55, Claim 16, please delete "b1 of the HARO-ACK" and insert --$b_1$ of the HARQ-ACK--.

Signed and Sealed this  
Twenty-seventh Day of May, 2025

Coke Morgan Stewart  
*Acting Director of the United States Patent and Trademark Office*